(12) United States Patent
Iocco et al.

(10) Patent No.: US 10,947,711 B2
(45) Date of Patent: *Mar. 16, 2021

(54) UNDERMOUNT SINK REPAIR APPARATUS AND METHOD

(71) Applicants: Augustine Albert Iocco, Harrison City, PA (US); Matthew Augustine Iocco, Murrysville, PA (US)

(72) Inventors: Augustine Albert Iocco, Harrison City, PA (US); Matthew Augustine Iocco, Murrysville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,570

(22) Filed: Dec. 11, 2019

(65) Prior Publication Data

US 2020/0149259 A1 May 14, 2020

Related U.S. Application Data

(63) Continuation-in-part of application No. 16/188,804, filed on Nov. 13, 2018, now Pat. No. 10,662,632.

(51) Int. Cl.
| | | |
|---|---|---|
| *E03C 1/32* | (2006.01) | |
| *E03C 1/324* | (2006.01) | |
| *E03C 1/33* | (2006.01) | |
| *B23P 6/00* | (2006.01) | |

(52) U.S. Cl.
CPC . *E03C 1/33* (2013.01); *B23P 6/00* (2013.01)

(58) Field of Classification Search
CPC ... E03C 1/32; E03C 1/33; E03C 1/322; E03C 1/324; E03C 1/335; F16M 13/022
USPC ........ 4/631–635, 645, 647–649; 108/147.11, 108/147.16, 147.17; 248/244, 295.11, 248/544; 312/140.1, 140.3, 140.4; 29/890.141

See application file for complete search history.

(56) References Cited

U.S. PATENT DOCUMENTS

| | | | | |
|---|---|---|---|---|
| 1,116,091 A | * | 11/1914 | McDonald | A47B 57/567 248/244 |
| 2,173,569 A | * | 9/1939 | Troendle | B60N 3/004 297/146 |
| 2,233,342 A | * | 2/1941 | Crozier | E03C 1/322 4/648 |
| 2,283,794 A | * | 5/1942 | Crozier | E03C 1/324 4/648 |
| 2,457,373 A | * | 12/1948 | Hunter | A47B 5/02 248/244 |
| 2,812,521 A | * | 11/1957 | Skinner | E03C 1/33 4/636 |
| 4,016,608 A | * | 4/1977 | Khan | E03C 1/33 4/633 |

(Continued)

FOREIGN PATENT DOCUMENTS

EP 2395160 A2 * 12/2011 ............. E03C 1/322

*Primary Examiner* — Joshua E Rodden

(57) ABSTRACT

A fallen undermount sink complete repair apparatus includes a wall bracket having at least one flange portion configured for fixedly fastening to a vertical wall and a second central portion generally forming an obtuse angle to the flange portion, with an aperture therethrough. Additionally, there is an expandable elongated member pivotably attached at a proximal end to the wall bracket, and at the distal end of the elongated member is a sink bracket head portion generally perpendicular to that of the elongated member and configured to pivot and press against a portion of the underside rim of a detached sink.

10 Claims, 8 Drawing Sheets

(56) References Cited

U.S. PATENT DOCUMENTS

| | | | | |
|---|---|---|---|---|
| 4,175,292 A * | 11/1979 | Morrison | ............... | E03C 1/335 |
| | | | | 4/633 |
| 4,328,597 A * | 5/1982 | Bodin | .................... | E03C 1/324 |
| | | | | 4/312 |
| 4,432,106 A * | 2/1984 | Smith | .................... | E03C 1/335 |
| | | | | 4/633 |
| 5,050,253 A * | 9/1991 | Wasek | .................... | E03C 1/328 |
| | | | | 4/645 |
| 5,320,321 A * | 6/1994 | Muncada | .............. | B60N 3/005 |
| | | | | 248/443 |
| 5,538,206 A | 7/1996 | Sather | | |
| 5,669,314 A * | 9/1997 | Grant | ...................... | A47B 5/00 |
| | | | | 108/20 |
| 5,743,501 A | 4/1998 | Rapp | | |
| 7,429,021 B2 | 9/2008 | Sather | | |
| 9,290,919 B2 | 3/2016 | Blaine | | |
| 10,149,535 B2 * | 12/2018 | O'Keefe | ................ | A47B 57/04 |
| 10,563,387 B1 * | 2/2020 | Iocco | ........................ | E03C 1/33 |
| 10,662,632 B1 * | 5/2020 | Iocco | ........................ | E03C 1/324 |
| 2003/0154546 A1 * | 8/2003 | Romo | .................... | E03C 1/335 |
| | | | | 4/633 |
| 2010/0301175 A1 * | 12/2010 | Grayson | .................. | E03C 1/33 |
| | | | | 248/27.1 |

* cited by examiner

UNDERMOUNT SINK REPAIR APPARATUS AND METHOD

CROSS REFERENCE TO RELATED APPLICATION

The present application is a continuation-in-part of and claims the benefit of pending non-provisional application Ser. No. 16/188,804 filed on Nov. 13, 2018, parts of which are incorporated herein.

FIELD OF THE INVENTION

The present invention relates in general to a sink repair system and more particularly, this invention relates to a system for rapid repair of a fallen detached sink from under a countertop.

BACKGROUND OF THE INVENTION

Undermount sinks have frequently been attached under a countertop with just an adhesive. This attachment means is prone to eventually failing and allowing the sink to drop slightly or fall considerably downward. The job of reattaching a dropped or fallen sink has always been laborious and time consuming and having the need to remove the entire sink, plumbing supply lines and drains along with garbage disposals. The many types of sink brackets available in the marketplace pose different types of installation techniques but none of the prior art addresses reinstalling the sink by pushing the sink back into place. Information relevant to attempt to address this problem can be found in one exemplary type of crossmember suitable for the purpose of supporting sinks is described in U.S. Pat. No. 7,429,021 another exemplary crossmember suitable for use as a crossmember is described in U.S. Pat. No. 5,538,206. Rapp in U.S. Pat. No. 5,743,501 discloses a rail and bolt system for installing undermount sinks, but it must be installed before the sink is. Grayson in published US application 2010/0301075 discloses a brace system for under-sink support, but it requires a substantial gap between the sink and the cabinet wall. There is a long-standing need for a device and system that will enable a dropped sink to be jacked back up and permanently secured, especially when there is limited space to work with. Blaine in U.S. Pat. No. 9,290,919 discloses a fixed length support member that can be fastened at one end to a cabinet wall such as to hold up undermount sinks, but with no adjustment provisions once installed.

SUMMARY OF THE INVENTION

The present invention provides an apparatus and method of reattaching a sink to the countertop without the need to remove the sink, plumbing supply lines, drains or any other accessories like garbage disposals etc. The apparatus of this "neverfall sink repair system" includes a corner wall bracket for attachment to the side wall of the cabinet below the bottom level of the sink bowl. The wall bracket is connected to the proximal end of expandable elongated member typically as a threaded shaft that acts as a turnbuckle. At the opposite end of the turnbuckle is a pivoting sink head bracket that engages under the rim of the sink. Turning of the shaft of the turnbuckle in turn pushes the sink back up into place, and the bracket is left in place. One or more apparatus assemblies can be installed at other positions under the rim as needed.

OBJECTS OF THE INVENTION

It is therefore one of the primary object of the present invention is to provide a fast, simple, and economical way of reattaching and permanently securing an undermount sink to a countertop.

Another object of the present invention is to provide expansion of length and upward force by a turnbuckle action which by turning the shaft of the turnbuckle will raise the sink back into place such that it can also be permanently secured.

Still another object of the present invention is to provide an option of a wall bracket configured to fit into a corner of an under-the-sink cabinet.

An additional object of the present invention is to accommodate any irregularities in the sink rim by providing a double headed sink bracket that will engage the sink rim in two locations.

Still another object of the present invention is to significantly reduce the time needed to reinstall a dropped sink by not having to remove the sink and all that is attached, even when there is a narrow gap between the inside cabinet wall and sink.

An additional object of the present invention is to have a wall bracket that can be readily attached to the cabinet wall below the bottom of the sink and permit pivoting of an elongated member away from the wall.

Yet another object of the present invention is to provide long-lasting support via a lock nut that would stop the expandable member from loosening due to vibrations from the garbage disposals or from a thermal action.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

DETAILED DESCRIPTION OF A PRESENT PRESENTLY PREFERRED AND VARIOUS ALTERNATIVE EMBODIMENTS OF THE INVENTION

Figure 1:
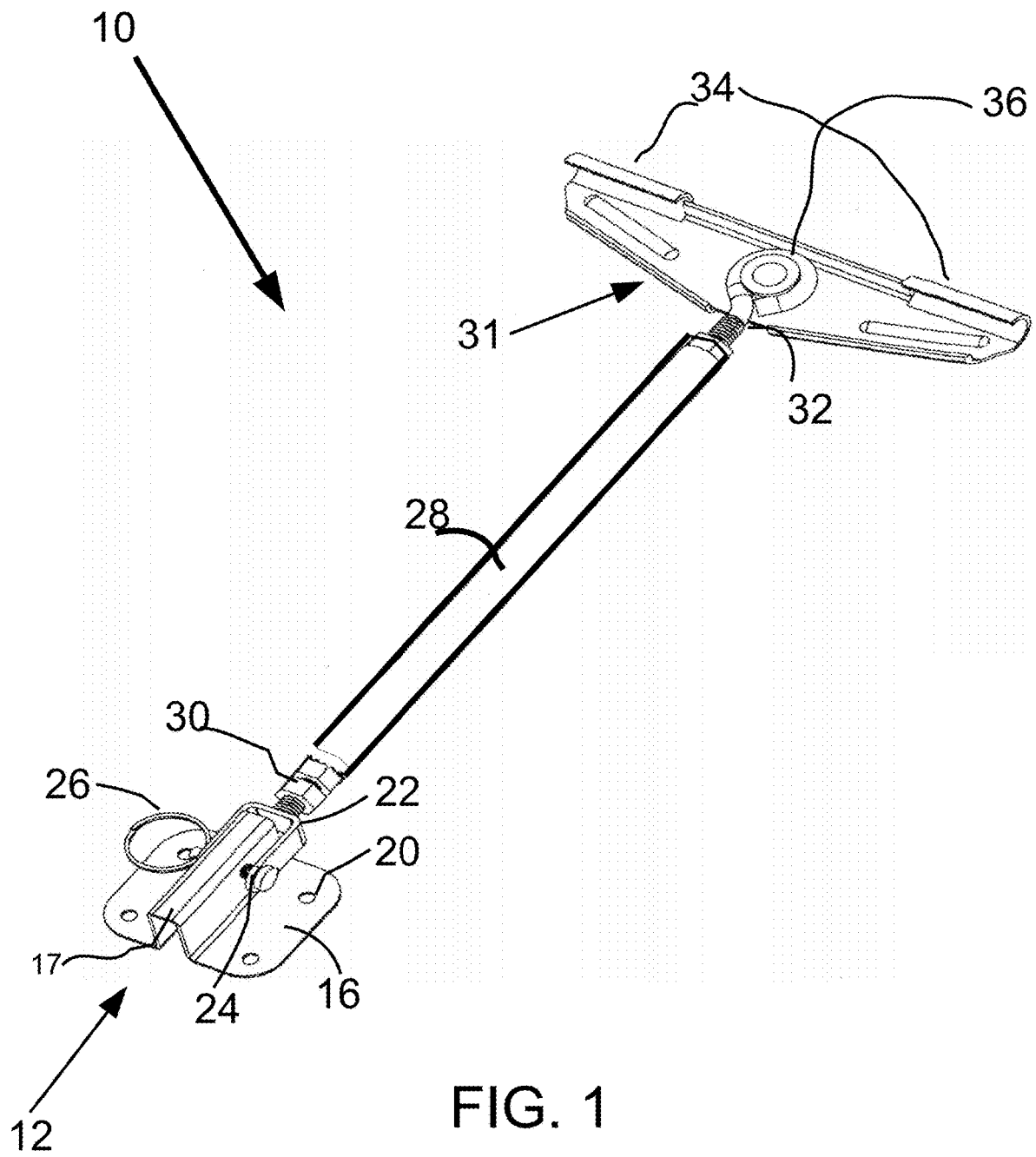
FIG. 1 is a perspective front view of the preferred embodiment of the present invention apparatus.

Prior to proceeding to the more detailed description of the present invention it should be noted that, for the sake of clarity and understanding, identical components which have identical functions have been identified with identical reference numerals throughout the several views illustrated in the figures. Referring initially to FIG. 1, this illustrates a perspective view of a preferred embodiment of the present sink repair apparatus generally shown as 10. The cabinet wall bracket 12 can have a single flange or two separated flanges 16 as shown, with holes 20 for mounting screws. A pivoting inverted U jaw 22 is attached to cabinet wall bracket 12 by pin 24 through an aperture, shown in FIG. 2, in the protruding raised center portion 17 of the wall bracket 12. The retainer clip 26 on the opposite side of the aperture holds the pin 24 in place. The pivoting nature of the jaw 22 allows the apparatus to pivot at various angles from the cabinet wall to accommodate a wide range of gaps between the wall and the sink. The jaw 22 is threaded on to an expandable elongated member 28, preferably a turnbuckle, by way of a right hand thread, and there is also a lock nut 30 at this point. Top of the turnbuckle 28 is threaded on to an eye bolt 32 with a left-handed thread. Eye bolt 32 is attached to the sink head bracket 31 by way of bolt or rivet 36 creating a pivoting action for better contact with the underside of the sink rim. Generally, the sink head bracket 31 has dual sink-contact pads 34 that engage the rim of the sink and push it upward by turning the shaft of the turnbuckle 28, which has two threaded portions at opposing ends. The turnbuckle 28 is at least 15 centimeters long and allows for easy manual expansion in a narrow space while minimizing any tendency to lift the sink and countertop off the cabinet. The ability of the sink head bracket 31 to pivot significantly enhances the contact of the two sink contact pads 34 with the underside of the sink rim for better support.

Figure 2:
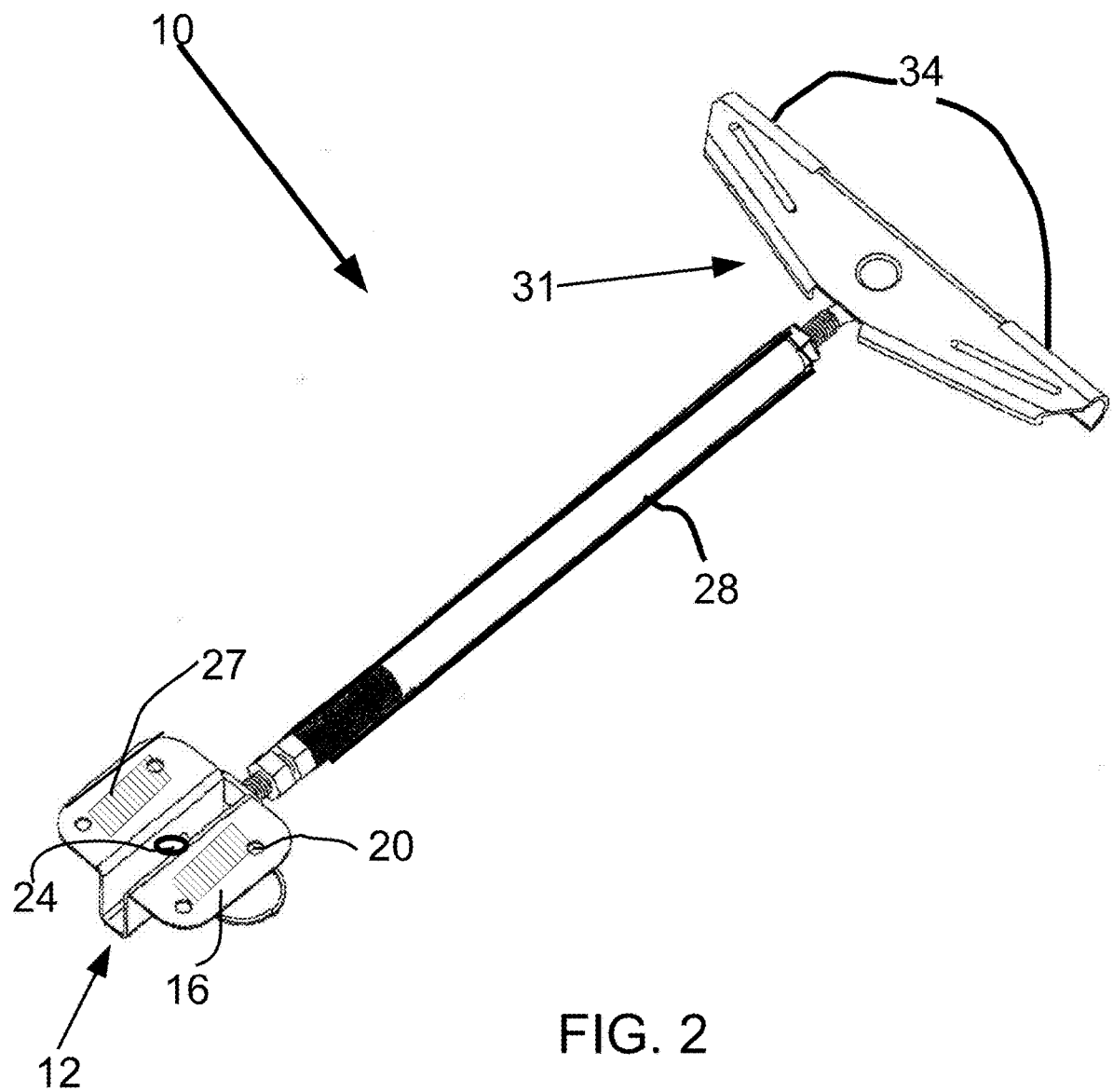
FIG. 2 provides a perspective rear view of the present invention.

FIG. 2 provides a perspective rear view of the present invention. Visible here are the two double-sided adhesive tape pads 27 on the back side of the flange portions 16 of the cabinet wall bracket 12, and also at least one aperture 24 through the central portion of the wall bracket. A cabinet wall bracket 12 can thus be temporarily attached to the cabinet wall by way of a double-sided adhesive tape 27 which is attached to the back of the wall bracket flanges 16. Once the proper location is confirmed, the apertures 20 accommodate screws to hold it firmly to the cabinet wall such that a considerable compression force can be maintained against the sink rim after the turnbuckle 28 is hand tightened.

Figure 3:
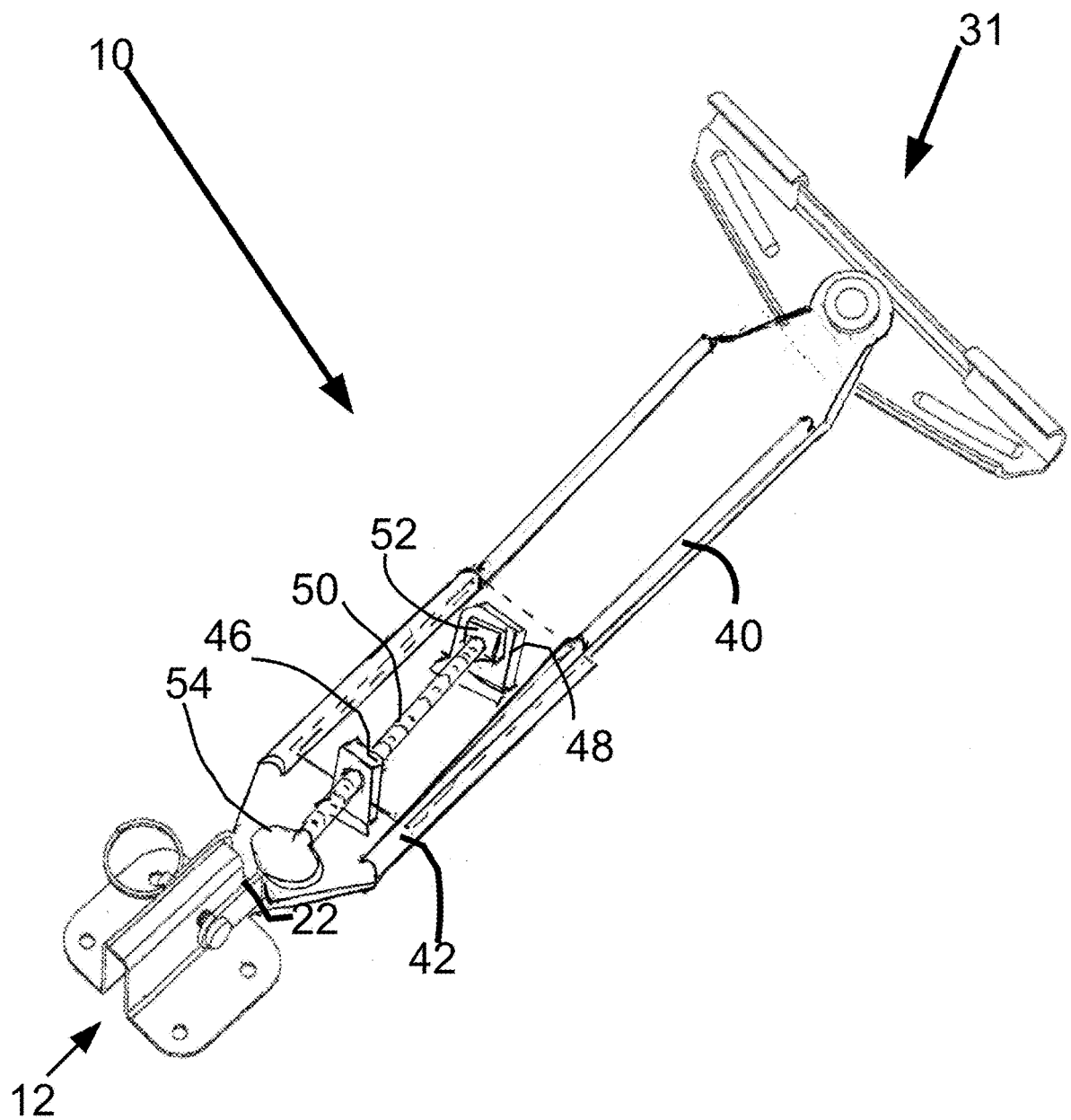
FIG. 3 provides a perspective front view of an alternative embodiment of present apparatus.

FIG. 3 provides a perspective front view of an alternative embodiment of present apparatus. The cabinet wall bracket 12 and the sink bracket portion 31 are the same as previously shown, but the elongated expandable member is made up of overlapping interlocking bars 40 and 42, with the channel edges of the narrower upper bar 40 fitting snugly but movably inside the curved channel edges of the lower bar 42. Each bar has a perpendicular tab, 46 and 48, fixedly attached to the bar surfaces. An aperture in lower tab 46 is either threaded or has a back-side nut through which the threaded rod 50 can be screwed back and forth. The threaded rod 50 has a thumb screw 54 at the proximal end and a push pad 52 threaded onto the distal end. Turning the thumb screw 54 forces the push pad 52 against tab 48 and enables the upper bar 40 to slide and to push the sink bracket 31 against the sink rim and secure it into the proper place.

Figure 4:
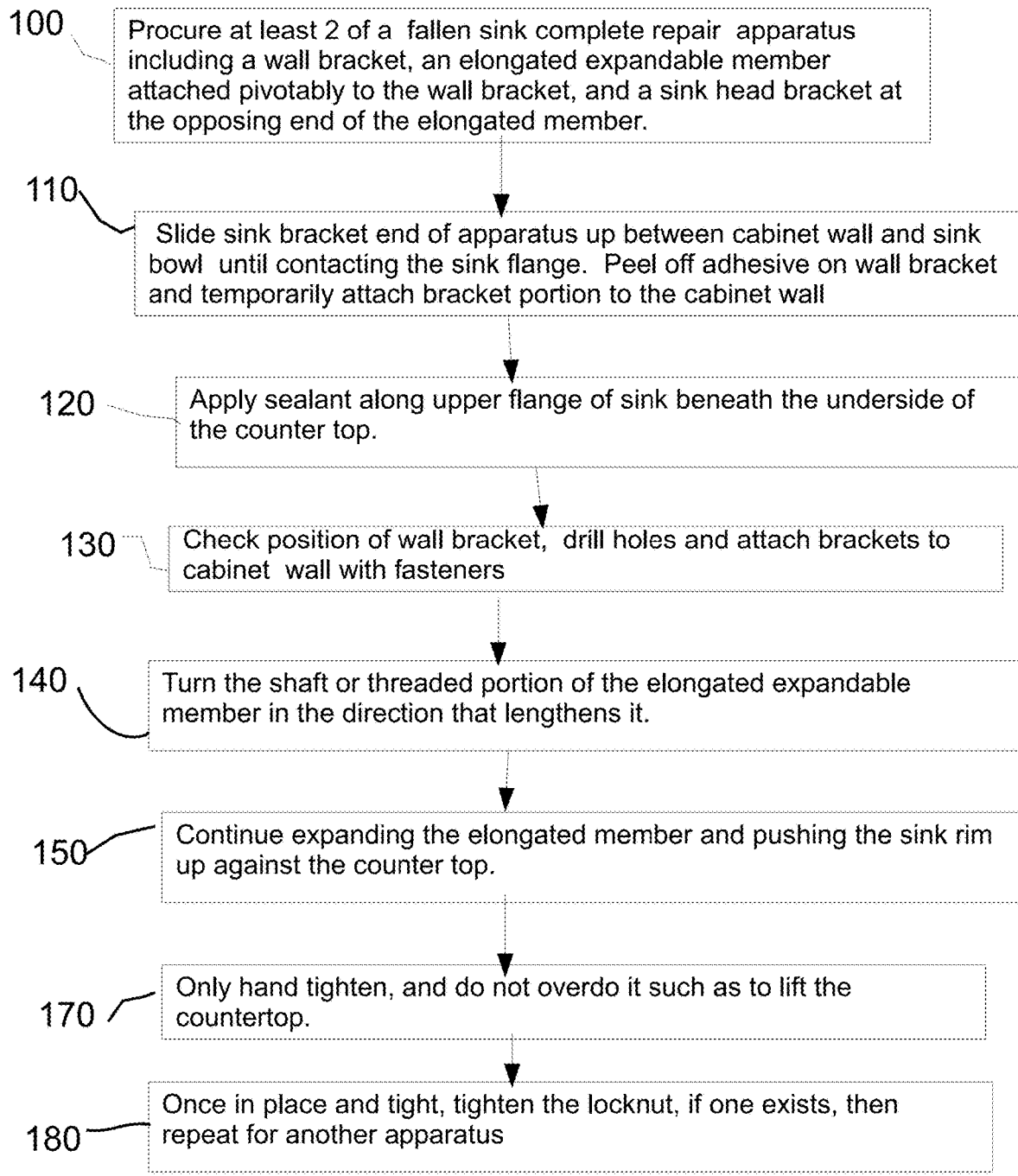
FIG. 4 is a flow diagram of a method of utilizing the apparatus of the present invention to restore a dropped/fallen sink.

FIG. 4 is a flow diagram of an exemplary method of utilizing the apparatus of the present invention to restore a dropped/fallen sink. This is just the preferred method of use that can be altered in many ways to accomplish the same objectives. It is not meant to limit the scope of workable methods. It starts at 100 with procuring one or more of the sink repair apparatuses described above. The method continues with applying sealant along the top rim of the sink and temporarily installing the wall bracket with the head bracket near the underside of the sink rim. These steps can be in either order. With step 130 the wall bracket is securely fastened to the cabinet wall, then the elongated member is expanded to jack up the sink until it is securely in place. One or more additional bracket apparatuses can be installed as needed. They are left in place as part of the permanent repair.

Figure 5:
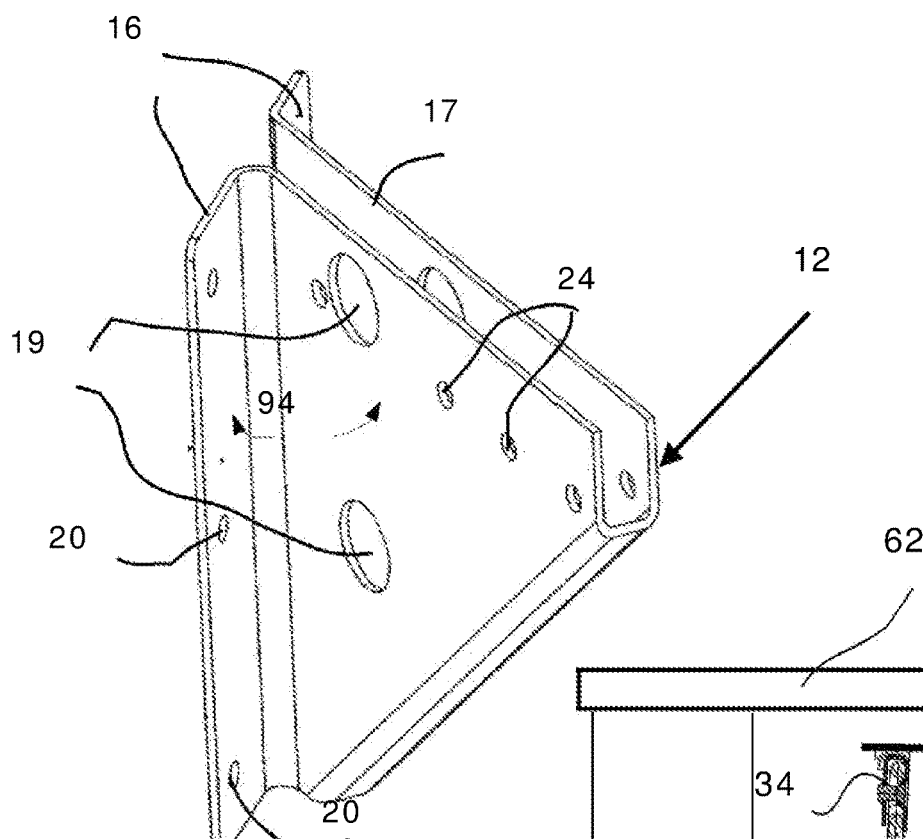
FIG. 5 provides an alternative wall bracket design for select situations.

FIG. 5 provides a perspective front view of an alternative embodiment of the wall bracket portion 12 of the present apparatus. The flanges 16 lie in the same plane, but the side wall of the central portion 17 forms an angle 94 with one of the flanges at less than 80 degrees. Apertures 20 in the flanges 16 allow for screws or other fasteners to fixedly attach the bracket portion 12 to a cabinet wall. Larger apertures 19 in the angled central portion permit screwdriver access to the screws at the upper two apertures 20. There are multiple apertures 24 for attaching the expandable elongated member as shown in FIG. 1. There are right hand and left hand configurations of this embodiment, but it is just a matter of toward which flange the less-than 80-degree angle resides. The main purpose of this alternative embodiment is to provide a way to utilize the sink repair apparatus above an area near a corner of an under-the-sink cabinet.

Figure 6:
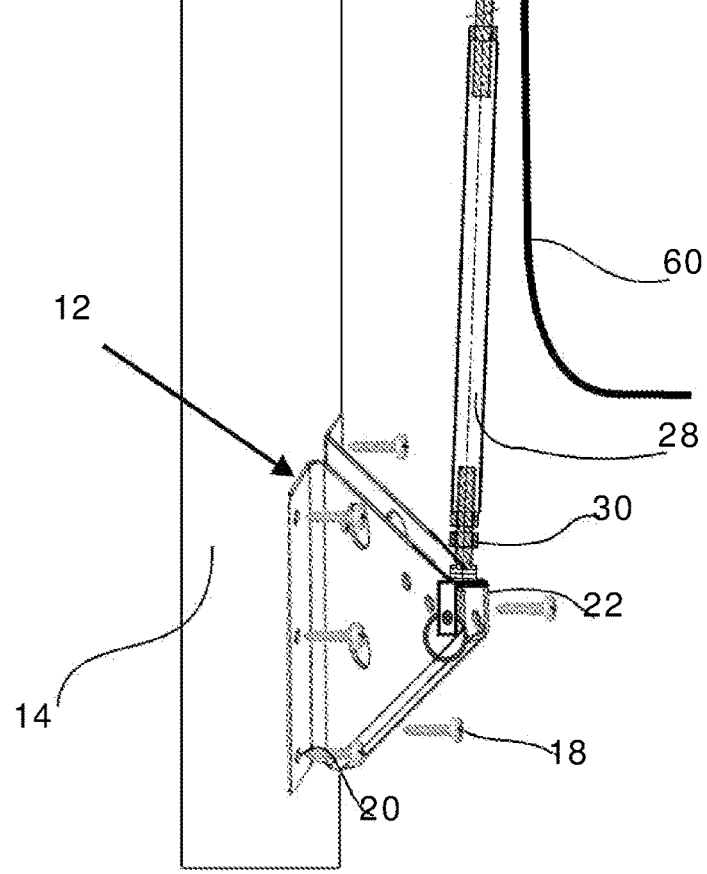
FIG. 6 illustrates the use of the apparatus in raising and securing a sink bowl against the underside of a countertop.

FIG. 6 illustrates the use of the apparatus of the present invention in raising and securing a fallen sink bowl 60 against the underside of a countertop 62, and is more fully described in the flow diagram of FIG. 4. It also illustrates how the present apparatus with its slim profile can fit into narrow gaps, and is long enough to permit installation from below the sink with the sink dropped down somewhat. The typical sink depth is about 9 inches or 23 centimeters, so the minimum length of the elongated connecting member 28 should be at least 15 centimeters. The cabinet wall bracket 12, once positioned, is then firmly attached to the wall 14 with screws 18. The connecting member 28 is then expanded by hand, turning the shaft in the case of a turnbuckle. Hand tightening is continued until the top pads 34 of the sink bracket press the lip of the sink 60 firmly against the underside of the countertop 62.

Figure 7:
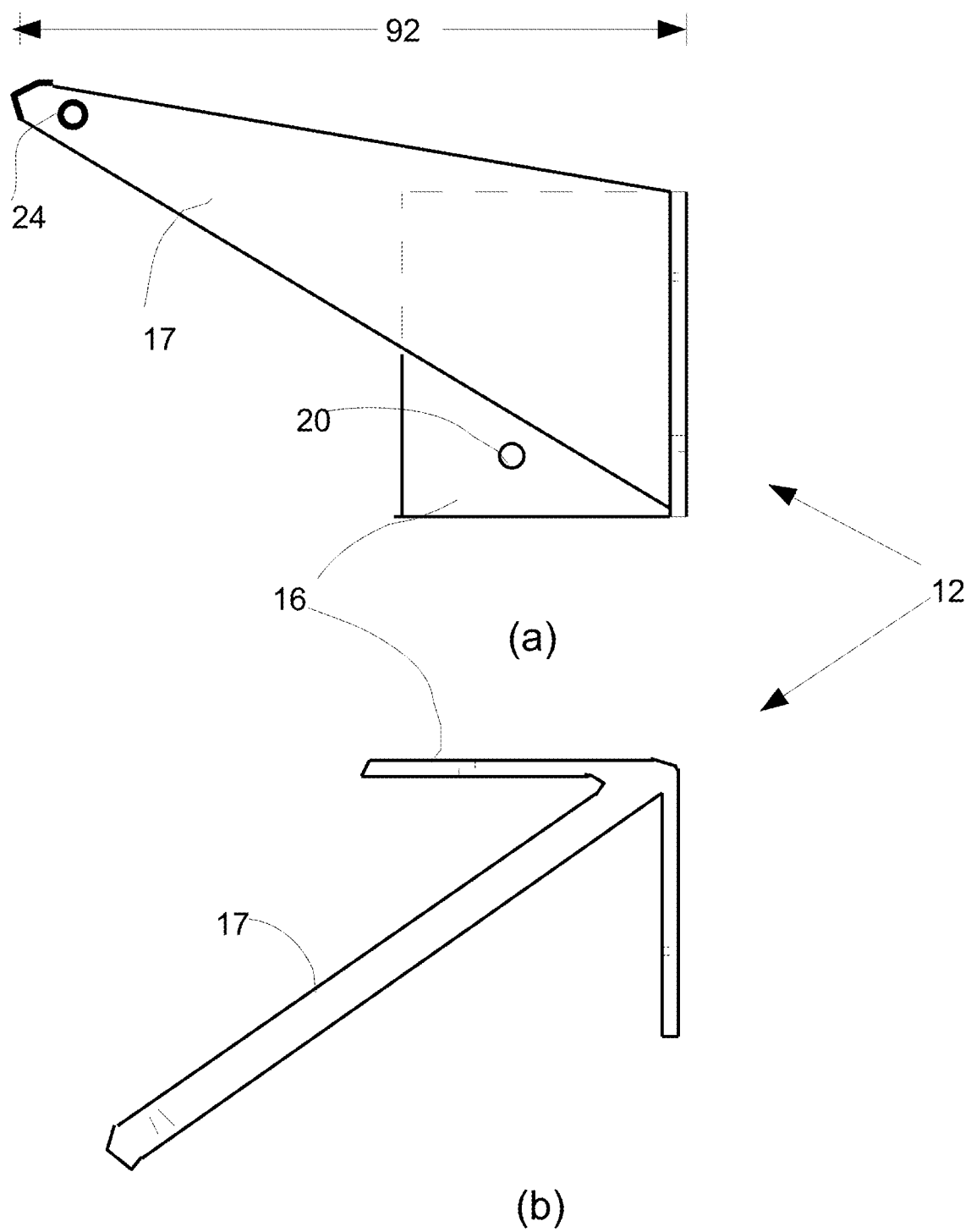
FIG. 7 provides a perspective front view and top plan view of an alternative embodiment of the wall bracket portion of the present apparatus.

FIG. 7 provides an alternative wall bracket design for select situations such as when a corner inside the cabinet is the best location for a wall bracket. This alternative wall bracket 12 is illustrated in a side elevation view (a) and a top view (b). The rest of the apparatus is the same as above with the elongated expandable member connection at aperture 24. As opposed to the corner bracket shown in FIG. 5, here the two flanges 16 are at a 90-degree angle with the central portion 17 within the 90-degree angle. The adhesive backing is optional. The center portion 17 is in this case elongated such that dimension 92 is a minimum of 6 centimeters (2.5 inches).

Figure 8:
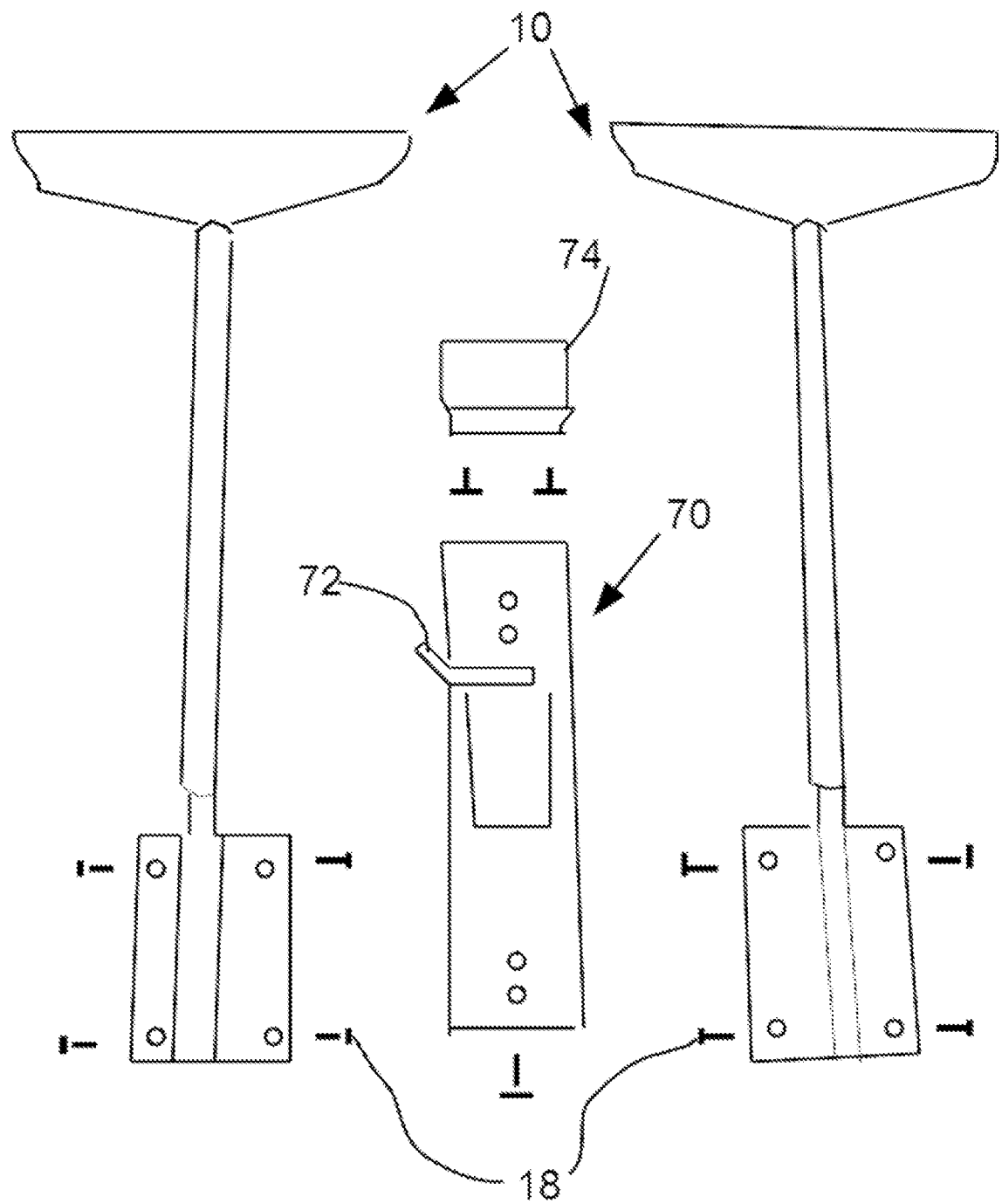
FIG. 8 is a plan view layout of a complete sink repair kit.

FIG. 8 is a plan view layout of a complete sink repair kit. It includes two of the sink repair apparatus 10 and one ratchet bracket 70 with sink support arm 72. Also, included is an adapter repair bracket 74 and all the screws 18 needed for attachment of all the cabinet wall brackets to the cabinet walls.

Figure 9:
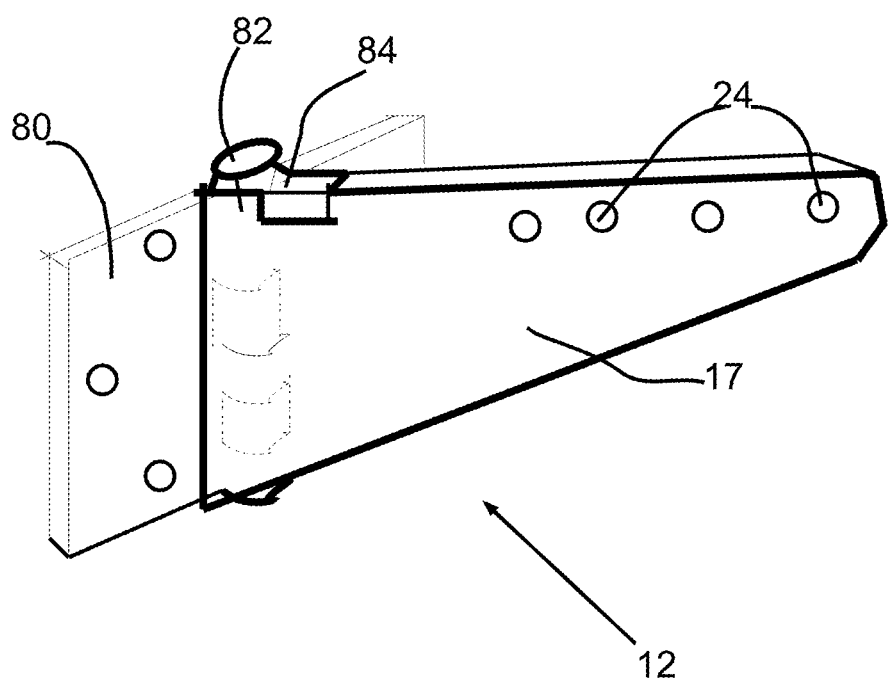
FIG. 9 provides a perspective view of a second alternative embodiment of the wall bracket portion of the present apparatus.

FIG. 9 provides a perspective view of a second alternative embodiment of the wall bracket portion 12 of the present apparatus with some similarities to that of FIG. 7. Instead of a fixed angle between the central portion, in this embodiment the angles is variable within almost a 180-degree range. In this second alternative, the flange portion is essentially a door hinge 80. The central portion 17 has a standard hinge bolt sleeve (not shown) such that it is pivotable connected to the hinge portion 80 with the standard hinge pin 82. Between the head of the pin and this central portion ring is a saddle clamp 84. Once the central portion 17 is positioned where desired, the pin 82 is fully pushed in and a rubber or star washer frictionally holds the washer clamp 84 and hence the central portion 17 in place. This is just one example of many possible ways to lock it in position at the desired angle, and there is no intent of being limited to just this one.

We claim:

1. A fallen undermount sink complete repair apparatus comprising:
    a) a wall bracket configured for weight bearing, said wall bracket having two flange portions configured for fixedly fastening to two vertical walls, and a protruding central portion between said flange portions, said central portion including at least one aperture there-through, wherein said two flange portions are generally at 90-degrees to one another, and said central portion has a minimum length of 6 centimeters;
    b) an expandable elongated member having a preselected minimum length with an overall length adjustable via at least one threaded portion, said elongated member pivotably attached at a proximal end to said central portion; and
    c) a sink bracket head portion centrally attached to a distal end of said elongated member and generally perpendicular to that of said expandable elongated member, said sink bracket head portion configured to press against a predetermined portion of an underside rim of a fallen undermount sink.

2. The apparatus of claim 1, wherein said sink bracket head portion has two sink-contact pads at opposing ends of a top edge of said sink bracket head portion.

3. The apparatus of claim 1, wherein said elongated member is a turnbuckle shaft with two threaded portions and a lock nut adjacent said proximal end.

4. The apparatus of claim 1, wherein said expandable elongated member is two overlapping interlocking channels configured for expanding by inclusion of a threaded rod operably contacting each of the two interlocking channels.

5. The apparatus of claim 1, wherein said expandable elongated member is pivotably attached to said wall bracket such as to be rotatable away from a cabinet wall.

6. The apparatus of claim 1, wherein said sink bracket head portion is free to pivot around a bolt attachment at said distal end of said expandable elongated member.

7. The apparatus of claim 1, wherein said minimum length of said expandable elongated member is at least 15 centimeters.

8. A fallen undermount sink repair apparatus comprising:
    a) a wall bracket configured for weight bearing, said wall bracket having two flange portions configured for fixedly fastening to two vertical walls, and a protruding central portion, wherein said two flange portions are in the same plane and said central portion forms an angle less than 80-degrees to one of said flanges, said central portion including at least one aperture there-through;
    b) an expandable elongated member having a preselected minimum length with an overall length adjustable via at least one threaded portion, said elongated member pivotably attached at a proximal end to said central portion; and
    c) a sink bracket head portion centrally attached to a distal end of said elongated member and generally perpendicular to that of said expandable elongated member, said sink bracket head portion configured to press against a predetermined portion of an underside rim of a fallen undermount sink.

9. The apparatus of claim 8, wherein said central portion includes screwdriver-access holes.

10. A fallen undermount sink repair apparatus comprising:
    a wall bracket configured for weight bearing, said wall bracket having two flange portions configured for fixedly fastening to at least one vertical wall, wherein said two flange portions are connected to a central portion with a removable pin, and configured such that the central portion is also pivotably attached to said pin such that an angle of the central portion with each of the flanges is variable over a wide range, and further includes means for locking said central portion in position;
    an expandable elongated member having a preselected minimum length with an overall length adjustable via at least one threaded portion, said elongated member pivotably attached at a proximal end to said central portion; and
    a sink bracket head portion centrally attached to a distal end of said elongated member and generally perpendicular to that of said expandable elongated member, said sink bracket head portion configured to press against a predetermined portion of an underside rim of a fallen undermount sink.

* * * * *